(12) United States Patent
Hu

(10) Patent No.: US 8,891,547 B2
(45) Date of Patent: Nov. 18, 2014

(54) LINK SCANNING METHOD FOR CASCADED REMOTE CONTROL UNITS, AND REMOTE ELECTRICAL TILT ANTENNA SYSTEM

(71) Applicant: Huawei Technologies Co., Ltd., Shenzhen (CN)

(72) Inventor: Aihua Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 13/762,857

(22) Filed: Feb. 8, 2013

(65) Prior Publication Data
US 2013/0156045 A1 Jun. 20, 2013

Related U.S. Application Data

(63) Continuation of application No. PCT/CN2011/075312, filed on Jun. 3, 2011.

(30) Foreign Application Priority Data

Aug. 20, 2010 (CN) .......................... 2010 1 0261194

(51) Int. Cl.
*H04L 12/28* (2006.01)
*H01Q 3/00* (2006.01)
*H04L 12/403* (2006.01)
*H04W 88/08* (2009.01)

(52) U.S. Cl.
CPC .............. *H04L 12/403* (2013.01); *H01Q 3/005* (2013.01); *H04W 88/085* (2013.01)
USPC .......................................................... 370/423

(58) Field of Classification Search
None
See application file for complete search history.

(56) References Cited

U.S. PATENT DOCUMENTS

2009/0197634 A1 8/2009 Sun et al.
2009/0291681 A1 11/2009 Hara
(Continued)

FOREIGN PATENT DOCUMENTS

CN 1905399 A 1/2007
CN 101035328 A 9/2007
(Continued)

OTHER PUBLICATIONS

PCT International Search Report mailed Sep. 22, 2011, issued in corresponding PCT Patent Application No. PCT/CN2011/075312.
(Continued)

*Primary Examiner* — Otis L Thompson, Jr.
(74) *Attorney, Agent, or Firm* — Staas & Halsey LLP

(57) ABSTRACT

The present invention discloses a link scanning method for cascaded RCUs and a remote electrical tilt antenna system. The method includes: receiving, a link scanning message and sending the link scanning message to the RCU in the next cascaded RCU; generating, a link scanning response message, sending the link scanning response message to the RCU in the preceding cascaded RCU, and reporting the link scanning response message to the CCU, and sending, the link scanning message to the CCU. In the present invention, by adding a time delay in the link of the remote end serial communication bus, each RCU does not respond to the link scanning message simultaneously, the time-delayed link scanning response messages in the link of the remote end serial communication bus of each RCU are not aliased, therefore, the bus conflict problem of the link scanning when the RCUs are cascaded is effectively solved.

12 Claims, 5 Drawing Sheets

(56) References Cited

U.S. PATENT DOCUMENTS

| | | | |
|---|---|---|---|
| 2010/0064194 A1* | 3/2010 | Liao | 714/752 |
| 2010/0278338 A1* | 11/2010 | Chang et al. | 380/200 |
| 2011/0032910 A1 | 2/2011 | Aarflot et al. | |

FOREIGN PATENT DOCUMENTS

| | | |
|---|---|---|
| CN | 101072041 | 11/2007 |
| CN | 101626581 A | 1/2010 |
| CN | 101674591 | 3/2010 |
| CN | 101938768 A | 1/2011 |
| CN | 102239715 A | 11/2011 |
| CN | 101938768 B | 12/2012 |
| EP | 2010/124462 A1 | 11/2010 |
| JP | 2008-516503 | 5/2008 |
| JP | 2009-284066 A | 3/2009 |

OTHER PUBLICATIONS

PCT Written Opinion of the International Searching Authority mailed Sep. 22, 2011, issued in corresponding PCT Patent Application No. 8147734PCT2.

International Search Report of Corresponding PCT Application PCT/CN2011/075312 mailed Sep. 22, 2011.

Japanese Office Action mailed Feb. 4, 2014 in corresponding Japanese Patent Application No. 2013-525119 (3 pages) (3 pages English Translation).

* cited by examiner

LINK SCANNING METHOD FOR CASCADED REMOTE CONTROL UNITS, AND REMOTE ELECTRICAL TILT ANTENNA SYSTEM

CROSS-REFERENCE TO RELATED APPLICATIONS

This application is a continuation of International Application No. PCT/CN2011/075312, filed on Jun. 3, 2011, which claims priority to Chinese Patent Application No. 201010261194.2, filed on Aug. 20, 2010, both of which are hereby incorporated by reference in their entireties.

FIELD OF TECHNOLOGY

The present invention relates to the technical field of communication antenna, and in particular, to a link scanning method for cascaded remote control units and a remote electrical tilt antenna system.

BACKGROUND

Along with the maturation of technologies related to remote electrical tilt antennas, operators are tending to use remote electrical tilt antennas. The remote electrical tilt antenna may significantly reduce cost for adjusting and maintaining an antenna downtilt, and improve working efficiency. A remote electrical tilt antenna system usually includes a smart bias-tee (Smart Bias-Tee, SBT for short), a remote control unit (Remote Control Unit, RCU for short), and an antenna supporting electrical tilting.

When a communication system has multiple remote electrical tilt antennas, RCUs of the multiple remote electrical tilt antennas are usually cascaded, so as to save SBTs. In an existing remote electrical tilt antenna system, when multiple RCUs are cascaded, they communicate with each other through a shared remote end serial communication bus such as an RS485 bus. The RS485 bus is a remote end serial communication bus in an industrial communication standard, and a CCU usually communicates with an RCU through the RS485 bus. When a center control unit (Center Control Unit, CCU for short) scans cascaded RCU links by using an XID (exchange identification) frame of a high-level data link control (High-Level Data Link Control, HDLC for short) protocol, multiple RCUs may respond to a link scanning message simultaneously, which causes bus conflict. Therefore, problems, such as link scanning failure, scanning incompletion and cascade order scanning error, are highly likely to occur.

To solve the problem of the bus conflict which may exist when multiple RCUs are cascaded, scanning is performed in the prior art according to RCU sequence numbers, by using an Antenna Interface Standards Group (Antenna Interface Standards Group, ASIG for short) protocol. Therefore, a sequence number of each RCU needs to be recorded when a remote electrical tilt antenna is mounted, sequence numbers of the RCUs should be staggered as far as possible, and the sequence numbers of the RCUs are used to perform link scanning in subsequent processes, so as to solve the problem of bus conflict.

However, the inventor finds that it is difficult to control the staggering of the RCU sequence numbers. If the sequence numbers of the RCUs are recorded when a remote electrical tilt antenna is mounted, the work load of mounting the RCUs is increased, and errors may occur during the recording. Therefore, it is very difficult to solve the bus conflict in the RCU cascading by using the method according to prior art.

SUMMARY

The present invention provides a link scanning method for cascaded RCUs and a remote electrical tilt antenna system, so as to solve the bus conflict problem in link scanning when RCUs are cascaded.

The present invention provides a link scanning method for cascaded remote control units RCUs, including:

receiving, by cascaded RCUs, a link scanning message sent by a center control unit CCU, and sending, by each of the RCUs except the end RCU, the link scanning message to the RCU in the next cascaded RCU through a remote end serial communication bus;

generating, by each of the RCUs, a link scanning response message, sending, by each of the RCUs except the RCU directly communicating with the CCU, the link scanning response message to the RCU in the preceding cascaded RCU, and reporting the link scanning response message to the CCU cascaded RCU by cascaded RCU, and directly sending, by the RCU directly communicating with the CCU, the link scanning message to the CCU.

The time when each of the RCUs except the end RCU sends the link scanning message to the RCU in the next cascaded RCU is the time when each of the RCUs receives the link scanning message, plus a preset time delay; or, the time when each of the RCUs, except the end RCU and the RCU directly communicating with the CCU, sends the link scanning response message received from the RCU in the next cascaded RCU to the RCU in the preceding cascaded RCU is the time when each of the RCUs receives the link scanning response message sent by the RCU in the next cascaded RCU, plus a preset time delay; and the time when the RCU directly communicating with the CCU sends the link scanning response message received from the RCU in the next cascaded RCU to the CCU is the time when the RCU receives the link scanning response message sent by the RCU in the next cascaded RCU, plus a preset time delay.

The present invention further provides a remote electrical tilt antenna system, including cascaded remote control units RCUs communicating with a center control unit CCU; where the cascaded RCUs are configured to receive a link scanning message sent by the CCU, and among the cascaded RCUs, each of the RCUs, except the end RCU, sends the link scanning message to the RCU in the next cascaded RCU through a remote end serial communication bus;

after receiving the link scanning message, each of the cascaded RCUs generates a link scanning response message, each of the RCUs, except the RCU directly communicating with the CCU, sends the link scanning response message to the RCU in the preceding cascaded RCU and reports the link scanning response message to the CCU cascaded RCU by cascaded RCU, and the RCU, directly communicating with the CCU, directly sends the link scanning message to the CCU.

Among the cascaded RCUs, the time when each of the RCUs except the end RCU sends the link scanning message to the RCU in the next cascaded RCU is the time when each of the RCUs receives the link scanning message, plus a preset time delay; or, the time when each of the RCUs, except the end RCU and the RCU directly communicating with the CCU, sends the link scanning response message received from the RCU in the next cascaded RCU to the RCU in the preceding cascaded RCU is the time when each of the RCUs receives the link scanning response message sent by the RCU in the next cascaded RCU, plus a preset time delay; and the time when the RCU directly communicating with the CCU sends the link scanning response message received from the RCU in the next cascaded RCU to the CCU is the time when the RCU receives the link scanning response message sent by the RCU in the next cascaded RCU, plus a preset time delay.

In the present invention, by adding the time delay in the link of the remote end serial communication bus for each RCU, each RCU does not respond to the link scanning message simultaneously, so that time-delayed link scanning response messages in the link of the remote end serial communication bus of each RCU are not aliased, and therefore, the bus conflict problem of the link scanning when the RCUs are cascaded is effectively solved.

BRIEF DESCRIPTION OF THE DRAWINGS

To illustrate the technical solutions in the embodiments of the present invention more clearly, the accompanying drawings for describing the embodiments are briefly described in the following. Apparently, the accompanying drawings in the following description show some embodiments of the present invention, and persons skilled in the art may still derive other drawings from these accompanying drawings without creative efforts.

DETAILED DESCRIPTION

To make the objectives, technical solutions, and advantages of the embodiments of the present invention more comprehensible, the technical solutions in the embodiments of the present invention are clearly described in the following with reference to the accompanying drawings in the embodiments of the present invention. Apparently, the embodiments to be described are merely a part rather than all of the embodiments of the present invention. All other embodiments obtained by persons skilled in the art based on the embodiments of the present invention without creative efforts shall fall within the protection scope of the present invention.

Figure 1:
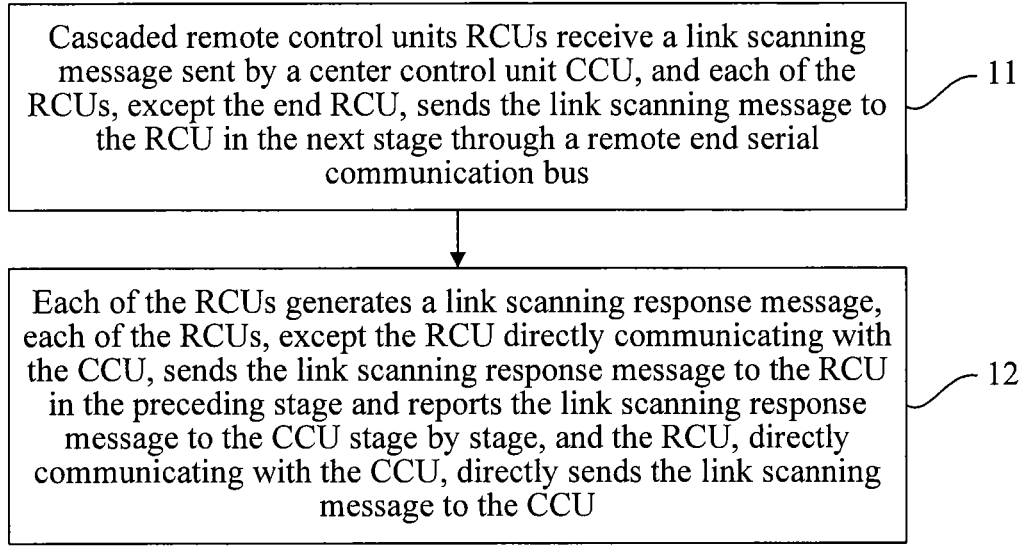
FIG. 1 is a flowchart of a link scanning method for cascaded RCUs provided in an embodiment of the present invention.

FIG. 1 is a flowchart of a link scanning method for cascaded RCUs provided in an embodiment of the present invention. As shown in FIG. 1, the method includes the following steps.

Step 11: Cascaded RCUs receive a link scanning message sent by a CCU, and each of the RCUs, except the end RCU, sends the link scanning message to the RCU in the next cascaded RCU through a remote end serial communication bus.

Step 12: Each of the RCUs generates a link scanning response message, each of the RCUs, except the RCU directly communicating with the CCU, sends the link scanning response message to the RCU in the preceding cascaded RCU and reports the link scanning response message to the CCU cascaded RCU by cascaded RCU, and the RCU, directly communicating with the CCU, directly sends the link scanning message to the CCU.

The time when each of the RCUs except the end RCU sends the link scanning message to the RCU in the next cascaded RCU is the time when each of the RCUs receives the link scanning message, plus a preset time delay; or, the time when each of the RCUs, except the end RCU and the RCU directly communicating with the CCU sends the link scanning response message received from the RCU in the next cascaded RCU to the RCU in the preceding cascaded RCU is the time when each of the RCUs receives the link scanning response message sent by the RCU in the next cascaded RCU, plus a preset time delay; and the time when the RCU directly communicating with the CCU sends the link scanning response message received from the RCU in the next cascaded RCU to the CCU is the time when the RCU receives the link scanning response message sent by the RCU in the next cascaded RCU, plus a preset time delay.

Preferably, when the RCU sends the link scanning message to the RCU in the next cascaded RCU, the following manner may be used: when the RCU receives the link scanning message, the RCU generates and sends the link scanning response message to the CCU first, and then sends the link scanning message to the RCU in the next cascaded RCU. At this time, the preset time delay is the time of the RCU generating and sending the link scanning response message after receiving the link scanning message.

Or, when the RCU sends the link scanning message to the RCU in the next cascaded RCU, the following manner may be used: when the RCU receives the link scanning message, the RCU sends the link scanning message to the RCU in the next cascaded RCU after a preset time delay, and the preset time delay is greater than the time of the RCU generating and sending the link scanning response message after receiving the link scanning message.

It should be noted that the preset time delay set in each RCU may be different.

In this embodiment, by adding the time delay in the link of the remote end serial communication bus for each RCU, each RCU does not respond to a link scanning message simultaneously, so that time-delayed link scanning response messages in the link of the remote end serial communication bus of each RCU are not aliased, and therefore, the bus conflict problem of the link scanning when the RCUs are cascaded is effectively solved.

In the foregoing embodiment, the RCUs forward the link scanning message or the link scanning response message by using multiple time delay manners, so that the time-delayed link scanning response messages in the link of the remote end serial communication bus of each RCU are not aliased. Specific methods of sending the link scanning message and scanning response message by each RCU are described in the following with reference to specific time delay manners.

Figure 2A:
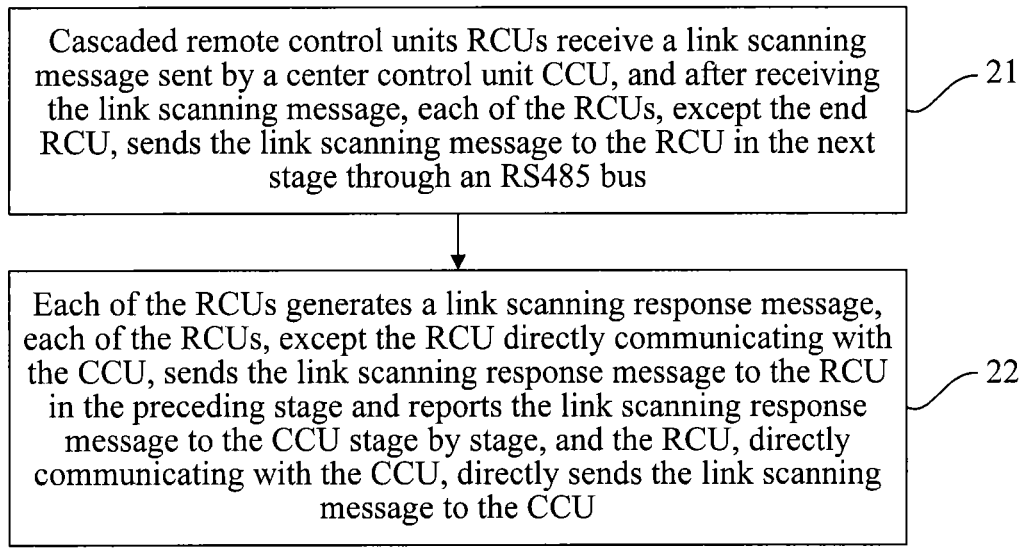
FIG. 2a is a flowchart of a link scanning method for cascaded RCUs provided in another embodiment of the present invention.

Refer to FIG. 2a which is a flowchart of a link scanning method for cascaded RCUs provided in another embodiment of the present invention. In this embodiment, a time delay procedure is added in a link of a remote end serial communication bus shared by multiple RCUs, so as to solve the problem of bus conflict which occurs when the CCU performs link scanning.

Figure 2B:
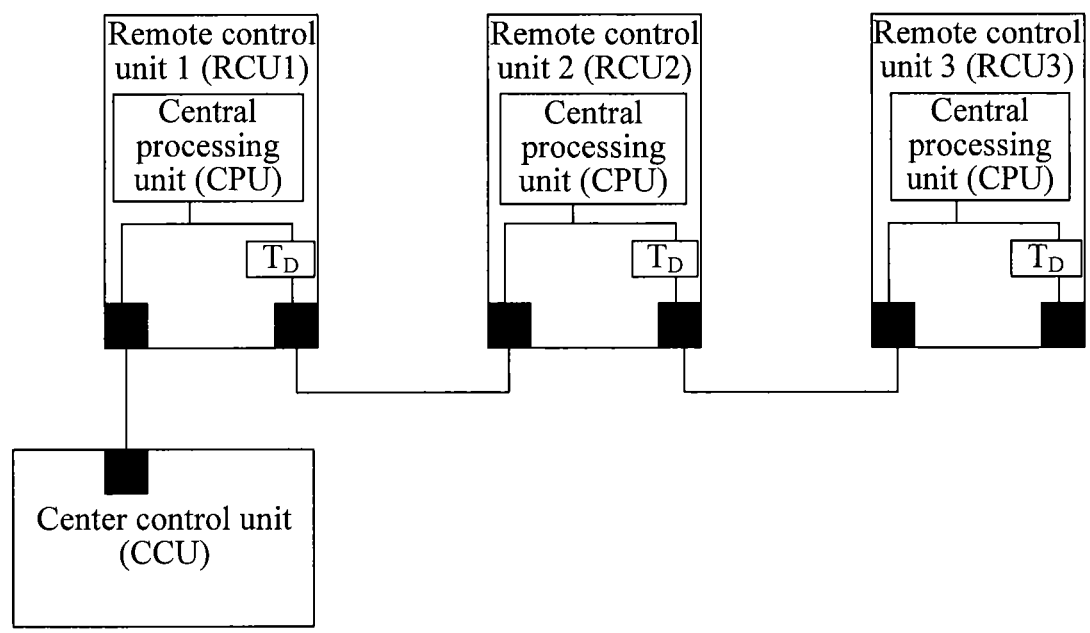
FIG. 2b is a schematic diagram of a scenario in which multiple RCUs are cascaded provided in another embodiment of the present invention.

Refer to FIG. 2b which is a schematic diagram of a scenario where multiple RCUs are cascaded provided in this embodiment. Usually, the number of the cascaded RCUs is at least 3. In FIG. 2b, RCUs are cascaded through a shared remote end serial communication bus, such as an RS485 bus. The RS485 bus is a remote end serial communication bus in the industrial communication standard, and the CCU usually communicates with the RCU through the RS485 bus. A time delay procedure is added in the link of the RS485 bus of each RCU, that is, a time delay procedure Td is arranged in the RS485 link of each RCU. Due to the effect of the time delay, link scanning response messages sent by each RCU in the RS485 link are not aliased, so that multiple RCUs do not send the link scanning response messages to the CCU simultaneously, thereby avoiding the problem of bus conflict.

Refer to the flowchart of the link scanning method for cascaded RCUs shown in FIG. 2a, where implementation subjects of the method according to this embodiment are the cascaded RCUs. The method includes the following steps:

Step 21: Cascaded RCUs receive a link scanning message sent by a CCU. After receiving the link scanning message, each of the RCUs, except the end RCU, sends the link scanning message to the RCU in the next cascaded RCU through the RS485 bus, and the time when the RCU sends the link scanning message to the RCU in the next cascaded RCU is the time when each RCU receives the link scanning message, plus a preset time delay.

When the CCU sends, through the RS485 bus, the link scanning message to the cascaded RCUs, due to the time delay procedure on the RS485 bus of the RCUs, each RCU receives the link scanning message in different time.

Refer to FIG. 2b, in which the CCU sends, through the RS485 bus, the link scanning message to an RCU1 connected to the CCU, the RCU1 sends, through a lower-level port, the link scanning message to an RCU2, and the RCU2 transmits the link scanning message to an RCU3. When sending, through a lower-level port, the link scanning message to the cascaded RCU in the next cascaded RCU, each RCU sends the link scanning message to the RCU in the next cascaded RCU after the time delay processing of the time delay procedure Td.

Figure 2C:
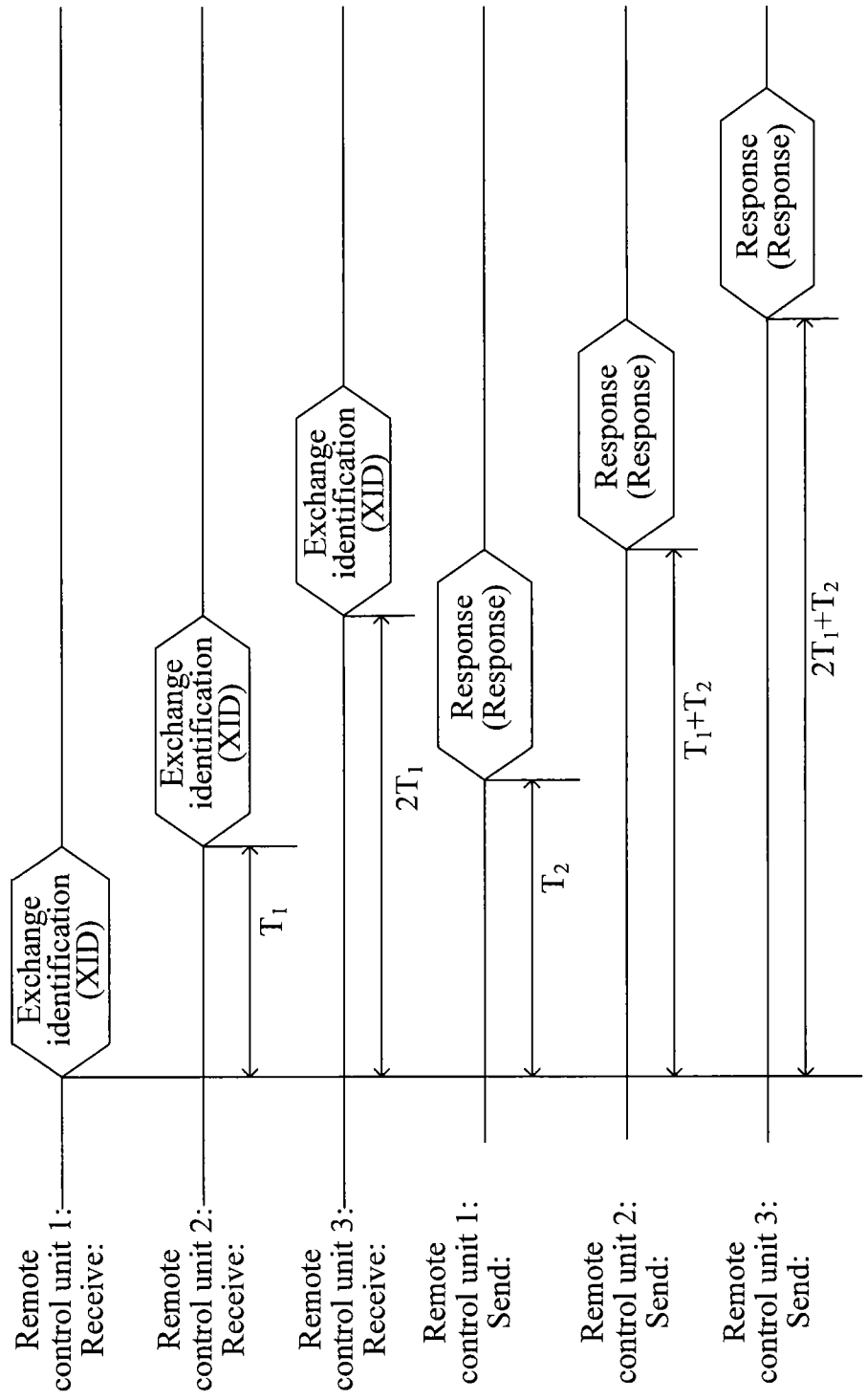
FIG. 2c is a schematic diagram illustrating an RCU receiving a link scanning message provided in another embodiment of the present invention.

In this embodiment, the time delay procedure Td is inserted in a downlink of the RS485 bus of the RCUs. Due to the existence of the time delay procedure, each RCU receives the link scanning message one by one in different time. FIG. 2c is a schematic diagram of the RCUs receiving the link scanning message. The preset time delay in the time delay procedure of each RCU is set to T1, and the time of the RCU generating and returning the link scanning response message after the RCU receives the link scanning message is set to T2. To ensure that no conflict exists in the time of each RCU returning the link scanning response message, the time delay T1 set in each RCU is greater than T2. Refer to FIG. 2b, in which the time delay of the RCU1 responding to the link scanning message is T2, the time delay of the RCU2 responding to the link scanning message is T1+T2, and the time delay of the RCU3 responding to the link scanning message is 2T1+T2. Link scanning response messages received by the CCU are not aliased, thereby ensuring the correctness of the link scanning.

The end RCU does not have a lower-cascaded RCU RCU connected thereto, so the end RCU merely needs to directly send the link scanning response message to the CCU. Each of the remaining RCUs needs to send the link scanning message to the RCU in the next cascaded RCU, and send the link scanning response message to the CCU.

Step 22: Each of the RCUs generates the link scanning response message, each of the RCUs, except the RCU directly communicating with the CCU, sends the link scanning response message to the RCU in the preceding cascaded RCU and reports the link scanning response message to the CCU cascaded RCU by cascaded RCU, and the RCU, directly communicating with the CCU, directly sends the link scanning message to the CCU.

As known from the foregoing method, the time delay procedure is added in the downlink of the RS485 bus for the RCUs. In this manner, when the CCU performs the link scanning, the link scanning response messages of the multiple cascaded RCUs may be staggered in time, thereby avoiding the problem of link conflict.

It should be noted that the time delays T1 set in each RCU may be the same or different in this embodiment. That is, the time delay T1 may be set according to actual conditions of a certain RCU, but it is usually needed that the set time delay T1 is greater than the time T2 of the RCU generating and returning the link scanning response message.

In this embodiment, by adding the time delay procedure to the link of the RS485 bus for the RCUs, each RCU does not respond to the link scanning message simultaneously, so that the time-delayed link scanning response messages in the RS485 link of each RCU are not aliased, and therefore, the bus conflict problem of the link scanning when the RCUs are cascaded is effectively solved, and a reliable operation of the remote electrical tilt antenna is ensured.

Figure 3A:
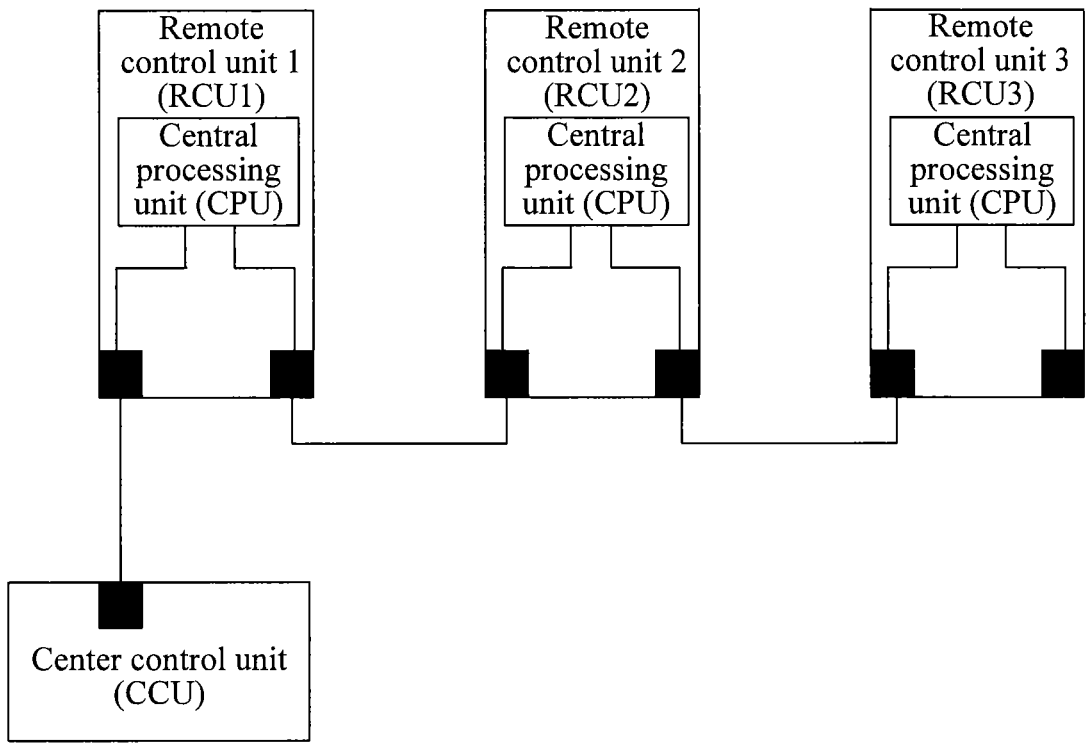
FIG. 3a is a schematic diagram of a scenario in which multiple RCUs are cascaded provided in still another embodiment of the present invention.

Preferably, the preset time delay T1 in the foregoing embodiment may be set to be equal to the time T2 of an RCU generating and returning a link scanning response message. During a specific implementation, when receiving a link scanning message, the RCU generates and returns a link scanning response message to an RCU in the preceding cascaded RCU or the CCU first, and then sends the link scanning message to an RCU in the next cascaded RCU. Refer to FIG. 3a which is a schematic diagram of a scenario where multiple RCUs are cascaded provided in still another embodiment of the present invention. In the figure, each RCU sends a link scanning message to an RCU in the next cascaded RCU by using the method.

Figure 3B:
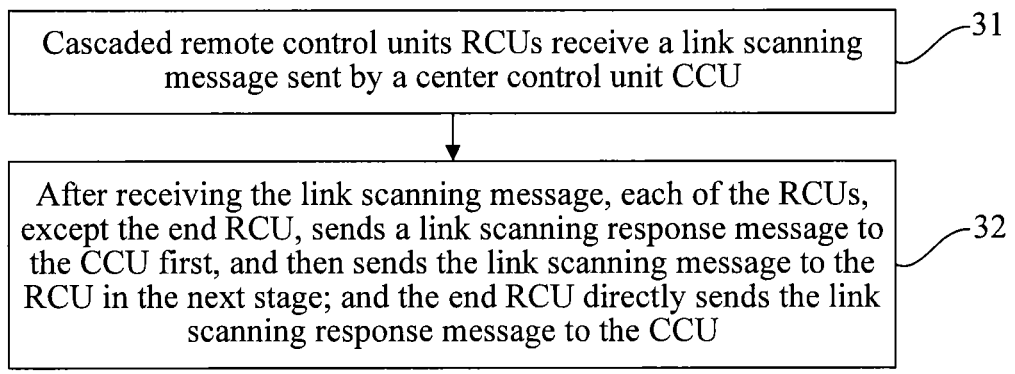
FIG. 3b is a flowchart of a link scanning method for cascaded RCUs provided in still another embodiment of the present invention.

For the corresponding flowchart of the link scanning method of the cascaded RCUs, reference may be made to FIG. 3b. Implementation subjects of the method may be the cascaded RCUs. The method includes the following steps:

Step 31: The cascaded RCUs receive a link scanning message sent by a CCU.

Refer to FIG. 3a, in which the CCU sends, through the RS485 bus, the link scanning message to the RCU1 connected to the CCU, the RCU1 sends, through a lower-level port, the link scanning message to the RCU2, and the RCU2 transmits the link scanning message to the RCU3.

Step 32: After receiving the link scanning message, each of the RCUs, except the end RCU, sends a link scanning response message to the CCU first, and then sends the link scanning message to the RCU in the next cascaded RCU; and the end RCU directly sends a link scanning response message to the CCU.

In this embodiment, each of the RCUs uses a store-and-forward manner when forwarding the link scanning message. Specifically, each of the RCUs sends the message at the same cascaded RCU first, and then forwards information from the RCU in the next cascaded RCU. In this manner, each of the RCUs does not respond to the link scanning message simultaneously, and the time-delayed link scanning response messages in the RS485 link of the RCUs are not aliased, and therefore, the bus conflict problem of the link scanning when the RCUs are cascaded is effectively solved and a reliable operation of the remote electrical tilt antenna is ensured.

Figure 4:
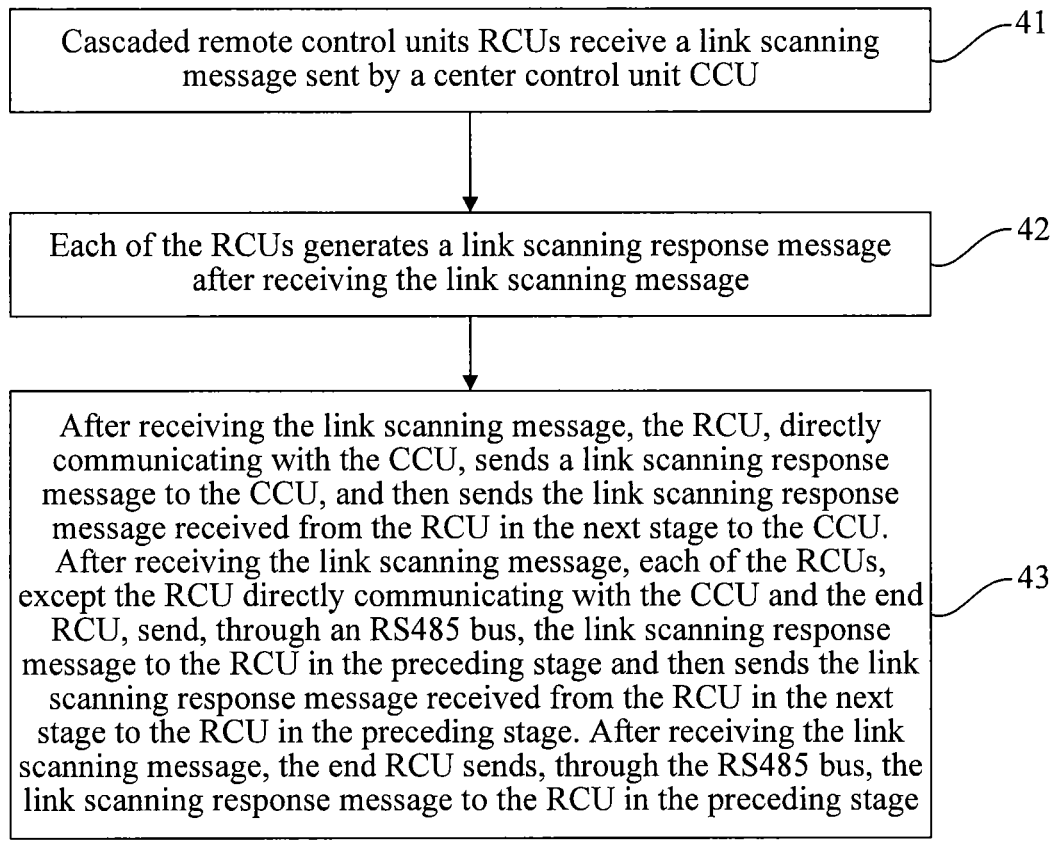
FIG. 4 is a flowchart of a link scanning method for cascaded RCUs provided in still another embodiment of the present invention.

Refer to FIG. 4 which is a flowchart of a link scanning method for cascaded RCUs provided in still another embodiment of the present invention. In the foregoing embodiment, the time delay procedure is set in the process when the RCU sends the link scanning message to the RCU in the next cascaded RCU. In this embodiment, a time delay procedure may be set in the process when an RCU sends a link scanning response message from an RCU in the next cascaded RCU to an RCU in the preceding cascaded RCU. A preset time delay T1 may be set to be equal to a time T2 of an RCU generating and returning the link scanning response message. During the specific implementation, when receiving the link scanning message, the RCU generates and returns the link scanning response message to the RCU in the preceding cascaded RCU or the CCU first. During the process, the RCU first caches the link scanning response message received from the RCU in the next cascaded RCU, and after sending out the link scanning response message of the RCU, the RCU sends the link scanning response message from the RCU in the next cascaded RCU to the RCU in the preceding cascaded RCU. In this embodiment, the schematic diagram of the scenario of the cascaded multiple RCUs is the same as that shown in FIG. 3a. By using the method, each of the RCUs in the figure sends the link scanning message to the RCU in the next cascaded RCU and sends the link scanning response message to the RCU in the preceding cascaded RCU.

Step 41: Cascaded RCUs receive the link scanning message sent by the CCU.

Refer to FIG. 4, in which the CCU sends, through the RS485 bus, the link scanning message to an RCU1 connected to the CCU, the RCU1 sends, through a lower-level port, the link scanning message to the RCU2, and the RCU2 transmits the link scanning message to the RCU3.

Step 42: Each RCU generates the link scanning response message after receiving the link scanning message.

Step 43: After receiving the link scanning message, the RCU, directly communicating with the CCU, sends the link scanning response message to the CCU, and then sends the link scanning response message received from the RCU in the next cascaded RCU to the CCU. After receiving the link scanning message, each of the RCUs, except the RCU directly communicating with the CCU and the end RCU, sends, through the RS485 bus, the link scanning response message to the RCU in the preceding cascaded RCU and then sends the link scanning response message received from the RCU in the next cascaded RCU to the RCU in the preceding cascaded RCU. After receiving the link scanning message, the end RCU sends, through the RS485 bus, the link scanning response message to the RCU in the preceding cascaded RCU.

In this embodiment, operations performed by the RCU directly communicating with the CCU, by the other RCUs in the middle, and by the end RCU are different.

After generating the link scanning response message, the RCU, directly communicating with the CCU, directly sends, through the RS485 bus, the link scanning response message to the CCU; and after sending the link scanning response message, the RCU sends the link scanning response message received from the RCU in the next cascaded RCU to the CCU. The RCU finally needs to forward the link scanning response messages of all the RCUs in the system.

Each of the RCUs in the middle need to send, through the RCU in the preceding cascaded RCU, the link scanning response message to the CCU. Each of the RCUs sends its link scanning response message first, and before completing sending its link scanning response message, each of the RCUs caches the link scanning response message received from the RCU in the next cascaded RCU even through the link scanning response message from the RCU in the next cascaded RCU has been received. After completing sending its link scanning response message, each of the RCUs forwards the link scanning response message received from the RCU in the next cascaded RCU.

The end RCU does not have a lower-cascaded RCU RUC connected to it, so the end RCU merely needs to send the link scanning response message to the CCU.

By using the foregoing method, the CCU does not receive the link scanning response messages from different RCUs at the same time, thereby avoiding the bus conflict.

In this embodiment, each of the RCUs uses a store-and-forward manner when forwarding the link scanning message. Specifically, each of the RCUs sends the message at the same cascaded RCU first, and then forwards information from the RCU in the next cascaded RCU. In this manner, each of the RCUs does not respond to the link scanning message simultaneously, and the time-delayed link scanning response messages in the RS485 link of the RCUs are not aliased, and therefore, the bus conflict problem of the link scanning when the RCUs are cascaded is effectively solved and the reliable operation of the remote electrical tilt antenna is ensured.

Figure 5:
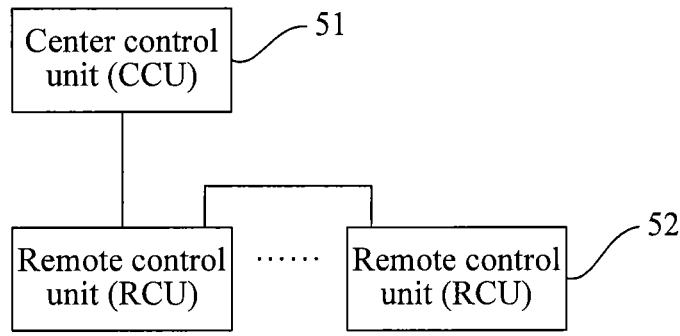
FIG. 5 is a schematic structural diagram of a remote electrical tilt antenna system provided in still another embodiment of the present invention.

FIG. 5 is a schematic structural diagram of a remote electrical tilt antenna system provided in still another embodiment of the present invention. As shown in FIG. 5, the remote electrical tilt antenna system according to this embodiment may include a CCU 51, an RCU 52, an SBT, and an antenna. In the electrical tilt system, multiple RCUs 52 are cascaded, the RCUs 52 are connected to the SBT, and the RCUs 52 perform, through the SBT, the electrical tilting on a downtilt of the antenna.

The cascaded RCUs 52 are configured to receive a link scanning message sent by the CCU 51, and among the cascaded RCUs 52, each of the RCUs 52, except the end RCU 52, sends the link scanning message to the RCU 52 in the next cascaded RCU through a remote end serial communication bus.

After receiving the link scanning message, each of the cascaded RCUs 52 generates a link scanning response message. Each of the RCUs 52, expect the RCU 52 directly communicating with the CCU 51, sends the link scanning response message to the RCU 52 in the preceding cascaded RCU and reports the link scanning response message to the CCU 51 cascaded RCU by cascaded RCU. The RCU 52, directly communicating with the CCU 51, directly sends the link scanning response message to the CCU 51.

Among the cascaded RCUs 52, the time when each of the RCUs 52 except the end RCU 52 sends the link scanning message to the RCU 52 in the next cascaded RCU is the time when each of the RCUs 52 receives the link scanning message, plus a preset time delay; or, the time when each of the RCUs 52, except the end RCU 52 and the RCU 52 directly communicating with the CCU 51, sends the link scanning response message received from the RCU 52 in the next cascaded RCU to the RCU 52 in the preceding cascaded RCU is the time when each of the RCUs 52 receives the link scanning response message sent by the RCU 52 in the next cascaded RCU, plus a preset time delay; and the time when the RCU 52, directly communicating with the CCU 51, sends the link scanning response message received from the RCU 52 in the next cascaded RCU to the CCU 51 is the time when the RCU 52 receives the link scanning response message sent by the RCU 52 in the next cascaded RCU, plus a preset time delay.

The CCU 51 sends the link scanning message to the RCU 52 connected to the CCU 51 through an RS485 bus.

The RCU 52 forwards the link scanning message to the RCU in the next cascaded RCU after a time delay. Specifically, a time delay procedure may be set in the RCU 52. When the RCU 52 forwards the link scanning message to the RCU 52 in the next cascaded RCU, the time delay procedure is performed first. After the preset time delay, the link scanning message is forwarded to the RCU 52 in the next cascaded RCU. To ensure that no conflict occurs between the time of each RCU 52 returning the link scanning response messages, the preset time delay set in each RCU 52 is greater than the time of the RCU 52 sending the link scanning response message after receiving the link scanning message.

It should be noted that the time delay set in each RCU 52 may be the same or different. That is, the time delay may be set according to actual conditions of a certain RCU 52, but it is usually needed that the set time delay is greater than the time of the RCU 52 generating and returning the link scanning response message.

Or, the RCU 52 forwards the link scanning message to the RCU 52 in the next cascaded RCU after a time delay. Specifically, the RCU 52 may send the link scanning response message to the CCU 51 first, and after sending the link scanning response message is completed, the RCU 52 forwards the link scanning message to the RCU in the next cascaded RCU. At this time, the preset time delay is the time of the RCU sending the link scanning response message after receiving the link scanning message.

For the interaction mechanism and effects between the CCU 51 and the RCU 52 in this embodiment, reference may be made to records of the embodiments corresponding to FIG. 1 to FIG. 4, and description is not made in detail here again.

In this embodiment, by adding the time delay to the link of the RS485 bus for each RCU, each RCU does not respond to the link scanning message simultaneously, so that the time-delayed link scanning response messages in the RS485 link of each RCU are not aliased, and therefore, the bus conflict problem of the link scanning when the RCUs are cascaded is effectively solved, and the reliable operation of the remote electrical tilt antenna is ensured.

Still another embodiment of the preset invention provides a remote electrical tilt antenna system which may include a CCU 51, an RCU 52, an SBT, and an antenna. In the electrical tilt system, multiple RCUs 52 are cascaded, the RCUs 52 are connected to the SBT, and the RCUs 52 perform, through the STB, the electrical tilting on a downtilt of the antenna.

The cascaded RCUs 52 receive a link scanning message sent by the CCU 51.

The RCU 52, which is one of the cascaded RCUs 52 and directly communicates with the CCU 51, is configured to: after receiving the link scanning message, generate a link scanning response message and send, through an RS485 bus, the link scanning response message to the CCU 51, and send a link scanning response message received from the RCU 52 in the next cascaded RCU to the CCU 51.

Each of the cascaded RCUs 52, except the RCU 52 directly communicating with the CCU 51 and the end RCU 52, is configured to: after receiving the link scanning message, generate a link scanning response message and send, through the RS485 bus, the link scanning response message to the RCU 52 in the preceding cascaded RCU, and then send the link scanning response message received from the RCU 52 in the next cascaded RCU to the RCU 52 in the preceding cascaded RCU.

The end RCU 52 of the cascaded RCUs 52 is configured to send a link scanning response message to the RCU 52 in the preceding cascaded RCU after receiving the link scanning message.

For the interaction mechanism and effects between the CCU 51 and the RCUs 52 in this embodiment, reference may be made to records of the embodiment corresponding to FIG. 4, and description is not made in detail here again.

In this embodiment, each of the RCUs uses a store-and-forward manner when forwarding the link scanning message, each of the RCUs does not respond to the link scanning message simultaneously, so that the time-delayed link scanning response messages in the RS485 link of each of the RCUs are not aliased, and therefore, the bus conflict problem of the link scanning when the RCUs are cascaded is effectively solved, and the reliable operation of the remote electrical tilt antenna is ensured.

It may be understood by persons skilled in the art that the accompanying drawings are merely schematic views of an embodiment, and modules or processes in the accompanying drawings are not necessarily needed for implementing the present invention.

Persons skilled in the art may understand that modules in the apparatuses provided in the embodiment may be arranged in the apparatuses in a distributed manner according to the description of the embodiment, or may be arranged in one or multiple apparatuses which are different from those described in the embodiments. The modules in the above embodiments may be combined into one module, or split into multiple sub-modules.

The sequence numbers of the preceding embodiments of the present invention are merely for description purpose but do not indicate the preference of the embodiments.

Persons skilled in the art may understand that all or a part of the steps of the methods in the embodiments may be implemented by a program instructing relevant hardware. The program may be stored in a computer readable storage medium. When the program runs, the steps of the methods in the embodiments are performed. The storage medium may be any medium that is capable of storing program codes, such as a ROM, a RAM, a magnetic disk, or an optical disk.

Finally, it should be noted that the above embodiments are merely intended for describing the technical solutions of the present invention other than limiting the present invention. Although the present invention is described in detail with reference to the foregoing embodiments, persons skilled in the art should understand that they may still make modifications to the technical solutions described in the foregoing embodiments or make equivalent substitutions to some technical features thereof, without departing from the spirit and scope of the technical solutions of the embodiments of the present invention.

What is claimed is:

1. A link scanning method for cascaded remote control units RCUs, comprising:
   receiving, by cascaded RCUs, a link scanning message sent by a center control unit CCU, sending, by each of the RCUs except an end RCU, the link scanning message to an RCU in the next cascaded RCU through a remote end serial communication bus;
   generating, by each of the RCUs, a link scanning response message, sending, by each of the RCUs except an RCU directly communicating with the CCU, the link scanning response message to an RCU in the preceding cascaded RCU, and reporting the link scannin response message to the CCU cascaded RCU b cascaded RCU and directly sending, by the RCU directly communicating with the CCU, the link scanning message to the CCU;

wherein the time when each of the RCUs except the end RCU sends the link scanning message to the RCU in the next cascaded RCU is the time when each of the RCUs receives the link scanning message, plus a preset time delay; or, the time when each of the RCUs, except the end RCU and the RCU directly communicating with the CCU, sends the link scanning response message received from the RCU in the next cascaded RCU to the RCU in the preceding cascaded RCU is the time when each of the RCUs receives the link scanning response message sent by the RCU in the next cascaded RCU, plus a preset time delay; and the time when the RCU directly communicating with the CCU sends the link scanning response message received from the RCU in the next cascaded RCU to the CCU is the time when the RCU receives the link scanning response message sent by the RCU in the next cascaded RCU, plus a preset time delay.

2. The method according to claim 1, wherein the method further comprises:

the time when the RCU sends the link scanning message to the RCU in the next cascaded RCU is the time when the RCU receives the link scanning message, plus a first preset time delay.

3. The method according to claim 1, wherein if the RCU is not an RCU directly communicating with the CCU, after the receiving, by the RCU, the link scanning response message sent by the RCU in the next cascaded RCU, the method further comprises:

send, by the RCU, the link scanning response message sent by the RCU in the next cascaded RCU, to an RCU in the preceding cascaded RCU.

4. The method according to claim 3, wherein the time when the RCU sends, to an RCU in the preceding cascaded RCU, the link scanning message sent by the RCU in the next cascaded RCU is the time when the RCU receives the link scanning response message sent by the RCU in the next cascaded RCU, plus a second time delay.

5. The method according to claim 1, wherein if the RCU is an RCU directly communicating with the CCU, the time when the RCU sends, to the CCU, the link scanning response message sent by the RCU in the next cascaded RCU is the time when the RCU receives the link scanning response message sent by the RCU in the next cascaded RCU, plus a third time delay.

6. The link scanning method for cascaded RCUs according to claim 1, wherein the preset time delay is the time of the RCU generating and sending the link scanning response message after receiving the link scanning message.

7. The link scanning method for cascaded RCUs according to claim 1, wherein the preset time delay is greater than the time of the RCU generating and sending the link scanning response message after receiving the link scanning message.

8. The link scanning method for cascaded RCUs according to claim 1, the preset time delay set in each of the RCUs is different.

9. A remote electrical tilt antenna system, comprising cascaded remote control units RCUs communicating with a center control unit CCU; wherein the cascaded RCUs are configured to receive a link scanning message sent by the CCU, and among the cascaded RCUs, each of the RCUs, except an end RCU, sends the link scanning message to an RCU in the next cascaded RCU through a remote end serial communication bus;

after receiving the link scanning message, each of the cascaded RCUs generates a link scanning response message, each of the RCUs, except an RCU directly communicating with the CCU, sends the link scanning response message to an RCU in the preceding cascaded RCU and reports the link scanning response message to the CCU cascaded RCU by cascaded RCU, and the RCU, directly communicating with the CCU, directly sends the link scanning message to the CCU; and among the cascaded RCUs, the time when each of the RCUs except the end RCU sends the link scanning message to the RCU in the next cascaded RCU is the time when each of the RCUs receives the link scanning message, plus a preset time delay; or, the time when each of the RCUs, except the end RCU and the RCU directly communicating with the CCU, sends the link scanning response message received from the RCU in the next cascaded RCU to the RCU in the preceding cascaded RCU is the time when each of the RCUs receives the link scanning response message sent by the RCU in the next cascaded RCU, plus a preset time delay; the time when the RCU directly communicating with the CCU sends the link scanning response message received from the RCU in the next cascaded RCU to the CCU is the time when the RCU receives the link scanning response message sent by the RCU in the next cascaded RCU, plus a preset time delay.

10. The remote electrical tilt antenna system according to claim 9, wherein the preset time delay is the time of the RCU generating and sending the link scanning response message after receiving the link scanning message.

11. The remote electrical tilt antenna system according to claim 9, wherein the preset time delay is greater than the time of the RCU generating and sending the link scanning response message after receiving the link scanning message.

12. The remote electrical tilt antenna system according to claim 9, the preset time delay set in each of the RCUs is different.

\* \* \* \* \*

UNITED STATES PATENT AND TRADEMARK OFFICE
CERTIFICATE OF CORRECTION

PATENT NO.        : 8,891,547 B2  
APPLICATION NO.   : 13/762857  
DATED             : November 18, 2014  
INVENTOR(S)       : Aihua Hu Page 1 of 1

It is certified that error appears in the above-identified patent and that said Letters Patent is hereby corrected as shown below:

In the Claims

Claim 1, Column 11, Line 1:

Delete "scannin" and insert --scanning--, therefor

Claim 1, Column 11, Line 2:

Delete "b" and insert --by--, therefor

Signed and Sealed this  
Second Day of June, 2015

Michelle K. Lee  
*Director of the United States Patent and Trademark Office*